United States Patent
Yutkowitz et al.

[11] Patent Number: 5,710,498
[45] Date of Patent: Jan. 20, 1998

[54] METHOD AND APPARATUS FOR FRICTION COMPENSATION

[75] Inventors: Stephen J. Yutkowitz; R. William Kneifel, II; Stephen T. Walsh, all of Cincinnati, Ohio

[73] Assignee: Trinova Corporation, Maumee, Ohio

[21] Appl. No.: 712,961

[22] Filed: Sep. 12, 1996

Related U.S. Application Data

[63] Continuation of Ser. No. 350,302, Dec. 6, 1994, abandoned.
[51] Int. Cl.$^6$ ..................................................... G05B 13/00
[52] U.S. Cl. .................. 318/632; 318/631; 318/568.22; 364/571.03
[58] Field of Search .................... 318/432, 434, 318/632, 631, 630, 611, 615, 561, 568.16, 568.22; 364/571.03, 571.02, 571.01, 474.19

[56] References Cited

U.S. PATENT DOCUMENTS

| | | | |
|---|---|---|---|
| 4,695,780 | 9/1987 | Kurakake et al. | 318/615 |
| 4,890,046 | 12/1989 | Kurakake et al. | 318/630 |
| 4,939,440 | 7/1990 | Bruke | 318/646 |
| 5,159,254 | 10/1992 | Teshima | 318/611 |
| 5,204,602 | 4/1993 | Iwashita | 318/632 |
| 5,239,248 | 8/1993 | Shimada et al. | 318/568.12 |
| 5,274,314 | 12/1993 | Maqueira | 318/640 |
| 5,304,906 | 4/1994 | Arita et al. | 318/630 |
| 5,305,158 | 4/1994 | Ueda et al. | 360/75 |
| 5,343,132 | 8/1994 | Iwashita | 318/630 |
| 5,389,865 | 2/1995 | Jacobus et al. | 318/568.11 |

OTHER PUBLICATIONS

"Observer—based Coulomb Friction Torque Compensation for a Position Control System", H. Henrichfreise, PCIM Conference 1992.

"On Adaptive Friction Compensation:", B. Friedland and Y. Park, IEEE Transactions on Automatic Control vol. 37, No. 10, Oct. 1992.

"State Position Control for Elastic Pointing and Tracking Systems with Gear Play and Coulomb Friction—Summary of Results", U. Schafer and G. Brandenburg, EPE '91, 4th European Conference on Power Electronics and Applns., vol. 2.

"Influence and Compensation of Coulomb Friction in Industrial Pointing and Tracking Systems", G. Brandenburg and U. Schafer, 1991 IEEE Industry Application Society Annual Meeting.

*Primary Examiner*—John W. Cabeca
*Attorney, Agent, or Firm*—Jones, Day, Reavis & Pogue

[57] ABSTRACT

Compensation for friction affecting motion of moveable machine members is effected in servo control of the member actuators. An estimate of velocity is used in evaluation of a model of frictional force to produce compensation values. Alternative embodiments provide continuous models of estimated velocity and frictional forces and state models of estimated velocity and frictional forces. Compensation values determined according to either embodiment may be produced for application to servo control commands such as position or torque. The compensation accounts for step changes of friction upon reversal of direction of travel.

17 Claims, 11 Drawing Sheets

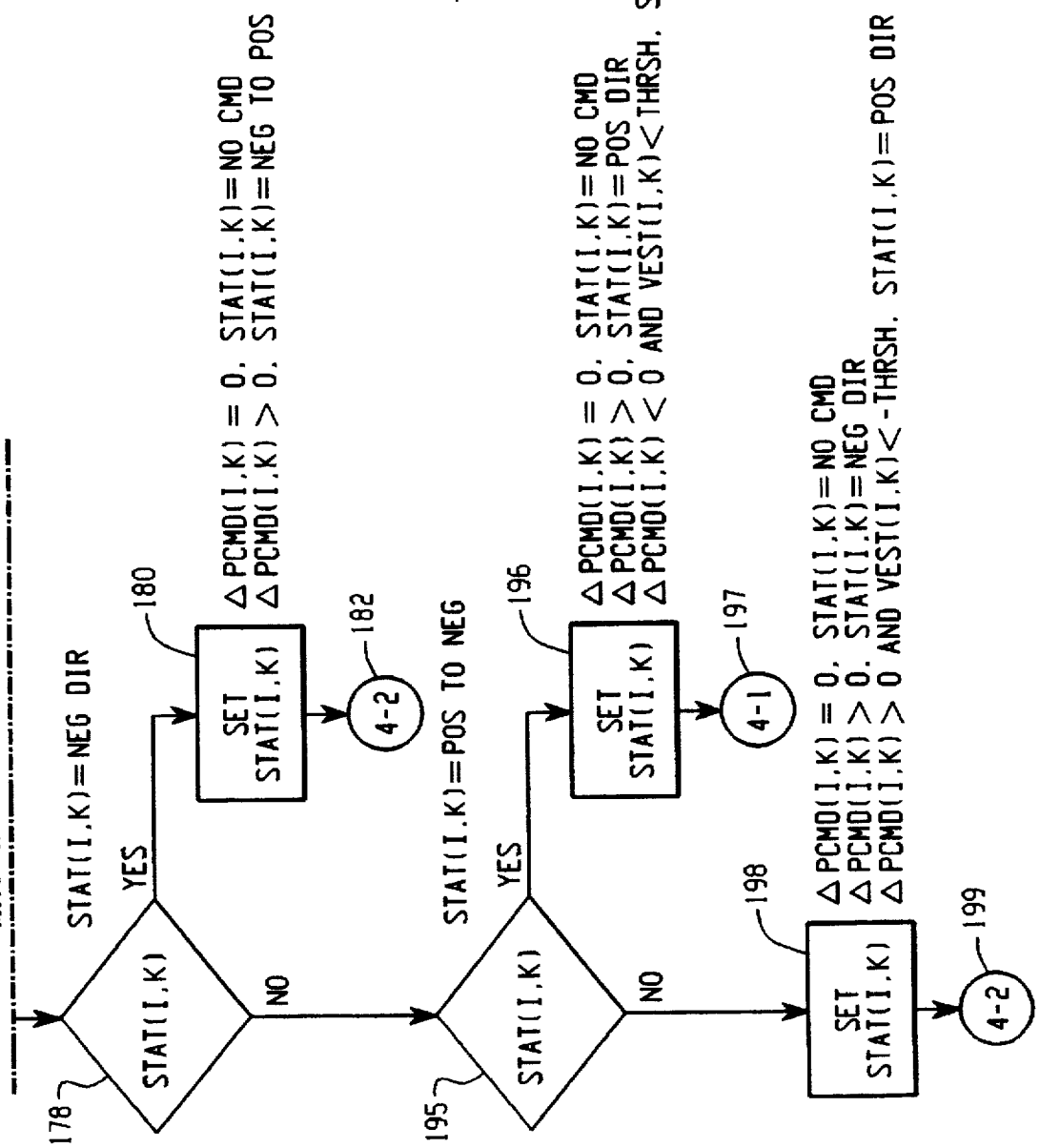

METHOD AND APPARATUS FOR FRICTION COMPENSATION

This application is a continuation of application Ser. No. 08/350,302 filed on Dec. 6, 1994 now abandoned.

BACKGROUND OF THE INVENTION

I. Field of the Invention

This invention relates to control of motion of machine members. In particular, this invention relates to compensation for frictional forces affecting motion of a servo controlled element.

II. Description of Related Art

FIG. 1a is a functional block diagram of a servomechanism control and including a representative showing of frictional forces, illustrated as torques. In FIG. 1a elements of the servomechanism are represented by their functional equivalents and control functions are represented with the S operator of the LaPlace transform. Position commands defining an instantaneous desired position are applied to a summing junction 12 where commanded position is compared to instantaneous actual position of the controlled element to produce a position loop error PE. At block 14 position loop error PE is multiplied by position loop gain KV implementing proportional gain of the position loop to produce a component for velocity command. At summing junction 15 the position loop velocity component is combined with velocity feedforward values VFF and actual velocity VA achieved by the controlled element to produce a velocity loop error VE. At block 16 velocity loop error VE is used in a compensator algorithm to produce a torque command value. At block 17 the torque command is scaled in accordance with the inverse of an estimated actuator torque constant KT and an estimated total moment of inertia J of the actuator and load to produce a current command. Block 117 represents motor conversion of current to torque according to actual torque constant KTA. Summing junction 18 represents mechanical summation of motor torque and opposing torques attributable to frictional forces acting on the motor and load. The net torque generated by the motor effects acceleration of the motor rotor and load. Block 19 represents the functional integration of this acceleration to produce velocity. This block includes scaling by the inverse of the actual moment of inertia JA of actuator and load. Block 120 represents integration of velocity to define position of the controlled element.

In the diagram of FIG. 1a, the effects of frictional torque imposed by the motor and load are represented by the model of block 122 which establishes a value of friction as a function of velocity and includes a step change at direction reversal characteristic of Coulomb friction. Because of the step change of frictional torque, acceleration of the load is discontinuous. With the servomechanism control of FIG. 1a, the resulting discontinuity of acceleration is ultimately corrected by propagation through the velocity and position control loops. However, the discontinuity of acceleration causes a transient in both the velocity loop error and the position loop error.

When it is desired to control two or more moveable members for simultaneous coordinated motion, velocity transients will appear as path errors wherever moveable members do not simultaneously reach desired positions. In circular motion, such path errors occur at quadrant crossovers where direction of one machine member reverses while the other continues in the same direction. FIG. 1b. is a plot of deviations of contour radius from desired radius throughout a circular path produced by coordinated motion of two machine members linearly moveable along axes orthogonal to one another, the member motion being controlled by servomechanisms illustrated by the functional block diagram of FIG. 1a. At the quadrant boundaries, i.e., radii 42, 44, 46 and 48, large deviation magnitudes occur which correspond to the contour errors introduced by the servomechanism response to the step change of torque on direction reversal. These deviation magnitudes are substantially greater than the average deviation magnitude occurring throughout the circular path.

U.S. Pat. No. 4,890,046 discloses a technique for compensation for friction at axis reversal wherein a compensation value is determined in response to a backlash correction signal generated by a numerical control. As disclosed, compensation is nil when the backlash correction is nil; compensation is positive when the backlash correction is positive; and, compensation is negative when the backlash correction is negative. No disclosure or suggestion is made of use of an estimate of actual velocity for determining the instant of axis reversal.

In "Observer-based Coulomb Friction Torque Compensation for a Position Control System" H. Henrichfreise, PCIM '92 Conference, a position control system with friction compensation is described wherein a state-space observer provides an estimate of Coulomb friction for compensation. The observer is responsive to measured velocity and position to produce the estimate of friction.

SUMMARY OF THE INVENTION

It is an object of the present invention to control an actuator for a moveable machine member to compensate for frictional forces affecting motion of the machine member.

It is a further object of the present invention to control an actuator for a moveable machine member to compensate for frictional force according to a model thereof.

It is a further object of the present invention to provide an estimate of actual velocity of a movable element of an actuator to control compensation for friction.

Further objects and advantages of the present invention shall become apparent from the drawings and the related description thereof.

An actuator is controlled to move a machine member according to position commands defining positions of the member. In accordance with the invention an estimate of velocity of the machine member is made and in response to the estimated velocity, a compensation is applied to control the actuator to overcome the effects of friction. The velocity estimate is particularly advantageous in compensating for the step change of friction associated with direction reversal.

BRIEF DESCRIPTION OF THE DRAWINGS

FIG. 1b is a representation of path errors generated by the servomechanism of FIG. 1a.

FIG. 2b is a representation of path errors generated by the servomechanism of FIG. 2a.

DETAILED DESCRIPTION OF THE PREFERRED EMBODIMENT

Figure 1A:
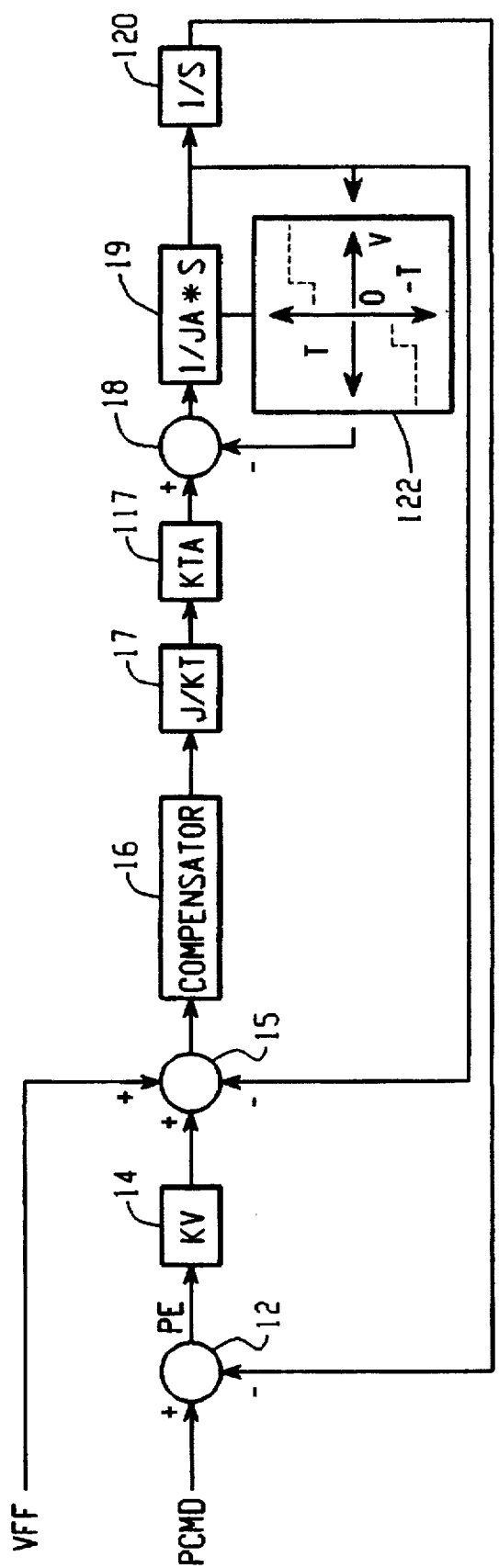
FIG. 1a is a functional block diagram of a servomechanism control.

Considering the servomechanism of FIG. 1a, it is desired that the servomechanism control produce a force to offset the frictional force. This may be accomplished by compensating commands input as force, velocity or position. In the preferred embodiments to be described herein, a servomechanism is described involving a rotating machine and techniques for modification of commanded position and, alternatively, commanded torque shall be described. The preferred embodiments describe implementations of compensation for systems wherein commands are produced periodically at a predetermined update interval and servomechanism control is effected in response to periodic sampling of measured values. While compensations of torque shall be described in detail with reference to the preferred embodiments, it is to be understood that for linearly operating actuators commands may be expressed in units of force and likewise the compensations for such commands.

Reversals reflected in commanded position or velocity occur before the actual moment of reversal of the controlled mechanism. Consequently, commanded values of position and velocity can not be relied on to effect compensation at the precise moment of reversal. Applicants have determined that compensation is to be effected in response to an estimate of velocity which accounts for servo mechanism response to commands.

Friction Compensation

Friction Models

Applicants have determined that the techniques for friction compensation of the present invention are advantageously applied to frictional forces including but not limited to Coulomb friction. Coulomb friction is modeled as a step function having oppositely signed magnitudes relative to direction reversal. An expression for Coulomb friction is:

$$FF = F_k * sgn(v)$$

Where:

FF=frictional force $F_k$=kinetic friction sgn(v)=sign of velocity v=velocity

Other models of frictional forces as functions of velocity are recognized and may be generically represented as follows:

$$(i)\ FF = F_k * sgn(v) + F_1(s) * sgn(v) + F_2(s,v)$$

Where $F_k$=kinetic friction $F_1(s)$=limit function (friction goes to 0 as function of speed); includes static friction $F_2(s,v)$=friction as function of speed and velocity; includes viscous friction s=speed=absolute value of velocity v=velocity Examples of $F_1(s)$ include:

$$F_1(s) = (F_s - F_k)/(1 + s/C)$$

and $$F_1(s) = (F_s - F_k) * e^{-(s/C)^\delta}$$

Where:

C=constant

δ=constant $F_k$=kinetic friction $F_s$=static friction $F_2(s,v)$ may be expressed as:

$$F_2(v) = \left( \sum_{i=1}^{n} F_i * s^i \right) * sgn(v)$$

Where:

i=1 to n and for i=1, $F_i$ is viscous friction

In accordance with the invention, a force or torque value calculated according to a selected model of friction is used in the creation of compensation values to be applied to inputs to a servo control, for example, position command compensations or torque command compensations. As the friction models require definition of values of certain parameters, including kinetic and/or static frictions, these values are determined to characterize the actual mechanisms being controlled. Values of the parameters are established for each command coordinate axis by measurement of actual response of the servomechanism of the affected machine member to commanded motion. Kinetic friction data is collected by measurement of, for example, current supplied to the actuator while effecting motion at selected velocities. Static friction data is collected by measurement of, for example, current required to be applied to an actuator to initiate motion from rest. Values of the parameters, including static and kinetic friction, can be extracted from the collected data of current supplied to the actuator using statistical methods applied to expressions derived from the selected model of frictional force. The extracted values may then be stored for subsequent recall. Where the extracted values of static and kinetic friction vary with direction and position within the range of travel of a command coordinate axis, these values may be tabulated by indices of position and/or direction. Determination of frictional forces to be compensated in accordance with an embodiment of the present invention is effected by periodic evaluation of a selected expression of frictional force using stored values of the required parameters.

Servo Compensation

Figure 2B:
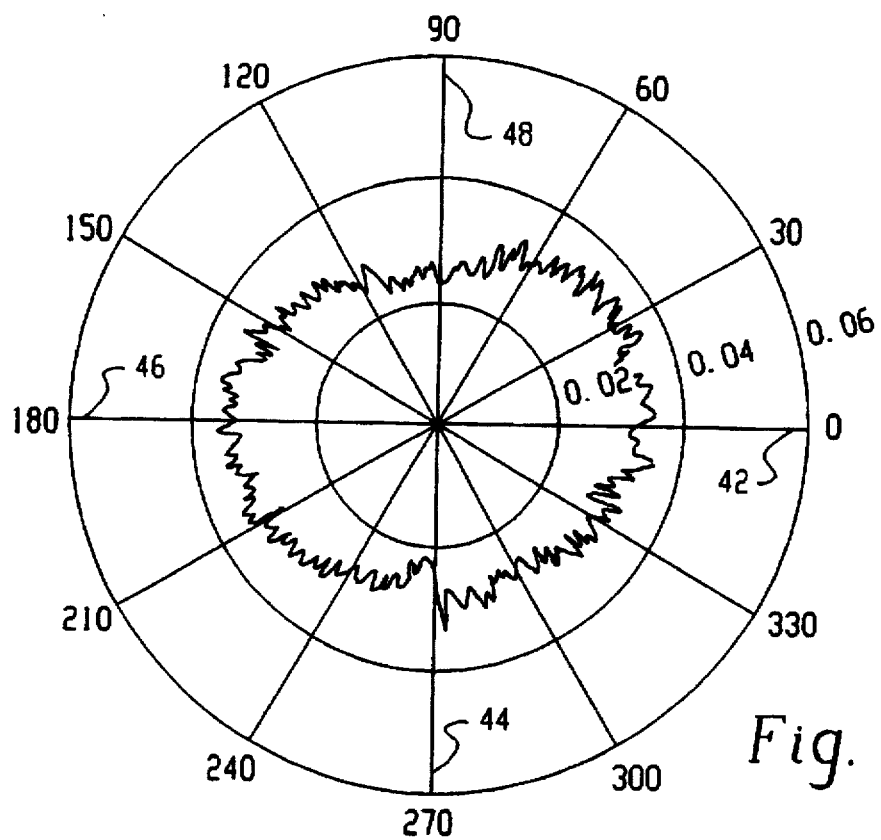
Figure 2A:
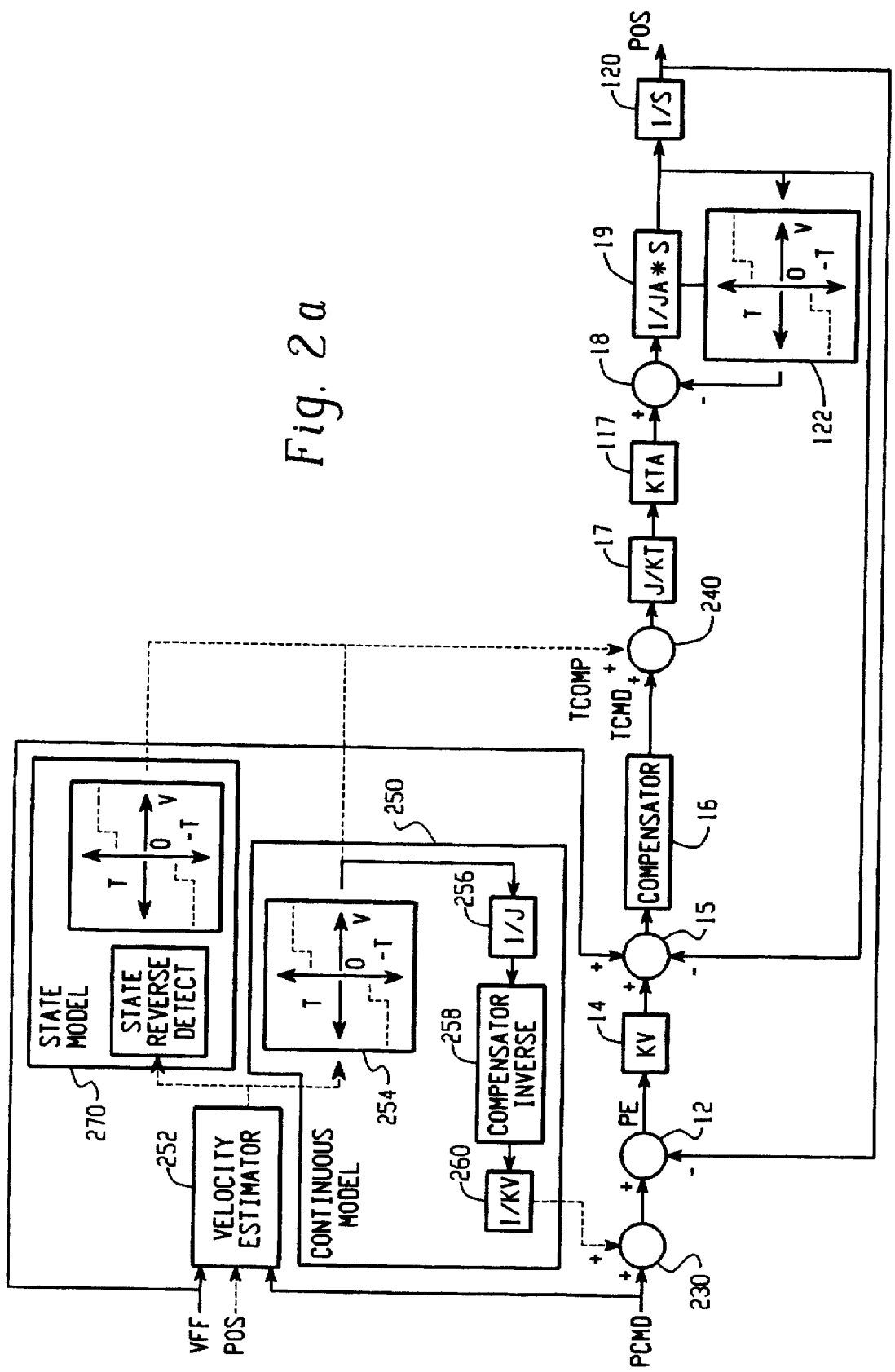
FIG. 2a is a functional block diagram of a servomechanism control implementing friction compensation.

FIG. 2a is a functional depiction of a servomechanism implementing compensation for frictional torques including Coulomb friction. Functional blocks corresponding to the functional blocks of the block diagram of FIG. 1a are designated by the same reference numbers.

Compensation for friction is implemented using an estimate of velocity. The velocity estimate is produced at block 252 and is applied alternatively, as indicated by the dashed lines, to a state model at block 270 and a continuous model at block 250. The output of the state controlled model is illustrated as being applied as a compensating torque command to summing junction 240 where torque commands produced by compensator 16 are summed with the compensating torque values. The output of the continuous model is illustrated as being applied to summing junction 230 as a position compensation and, as an alternative, as a compensating torque command to summing junction 240. As will be described, the continuous model control may be used to produce torque compensation rather than position compensation.

Figure 1B:
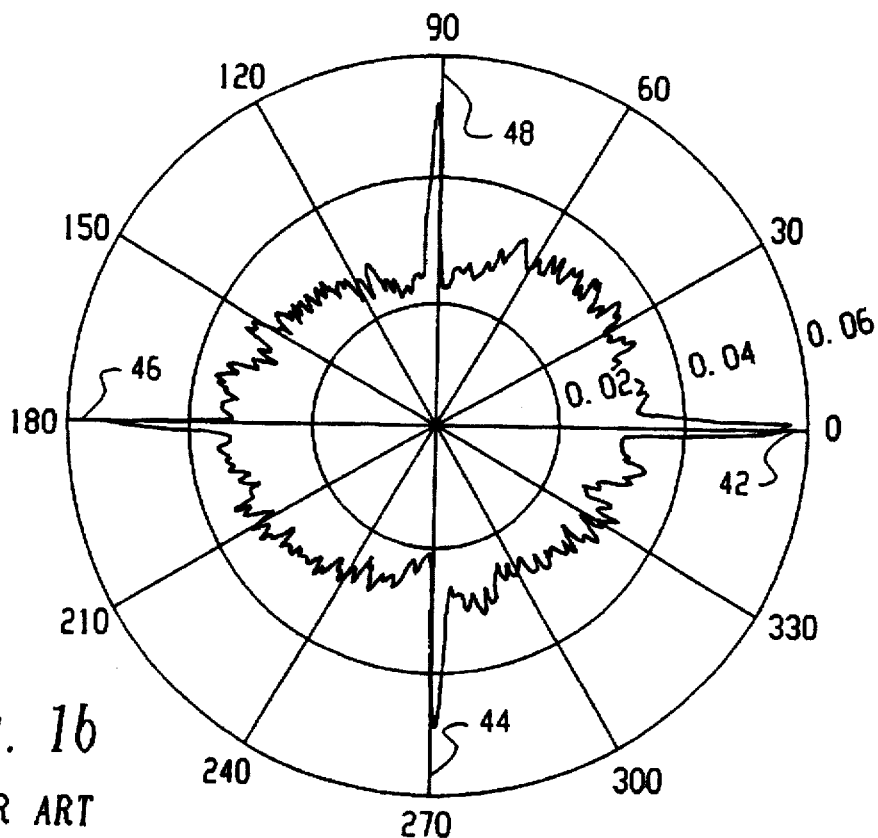

Reductions of path errors effected by friction compensation in accordance with the invention are illustrated by the plot of FIG. 2b. Substantial reductions of contour errors are noted at the quadrant cross-over points as compared to the results achieved without compensation as depicted in FIG. 1b. In particular, it is observed that deviation magnitudes at the quadrant cross-overs produced under the same conditions as obtained in the generation of the plot of FIG. 1b, are much nearer the average value of deviation occurring elsewhere throughout the circular path.

State Model Controlled Compensation

A state model of motor direction, as represented by commanded position is used to determine the value of compensation to be applied. The model, depicted graphically in FIG. 6, consists of states for positive direction POS DIR, positive to negative change of direction POS TO NEG, negative direction NEG DIR, negative to positive change of direction NEG TO POS, and no command NO CMD. Changes from one direction state to another occur only when an estimate of velocity reaches a threshold value following a commanded direction change. The velocity estimate approximates actual motor activity and is determined as the average of commanded and actual velocity. Actual velocity may be determined by direct measurement using, for example, a tachogenerator, or from changes of measured position over time. When the velocity estimate reaches a threshold value while in the positive to negative change of direction state, a transition is made to the negative direction state. When the velocity estimate reaches a threshold value while in the negative to positive change of direction state, a transition is made to the positive direction state.

Figure 6:
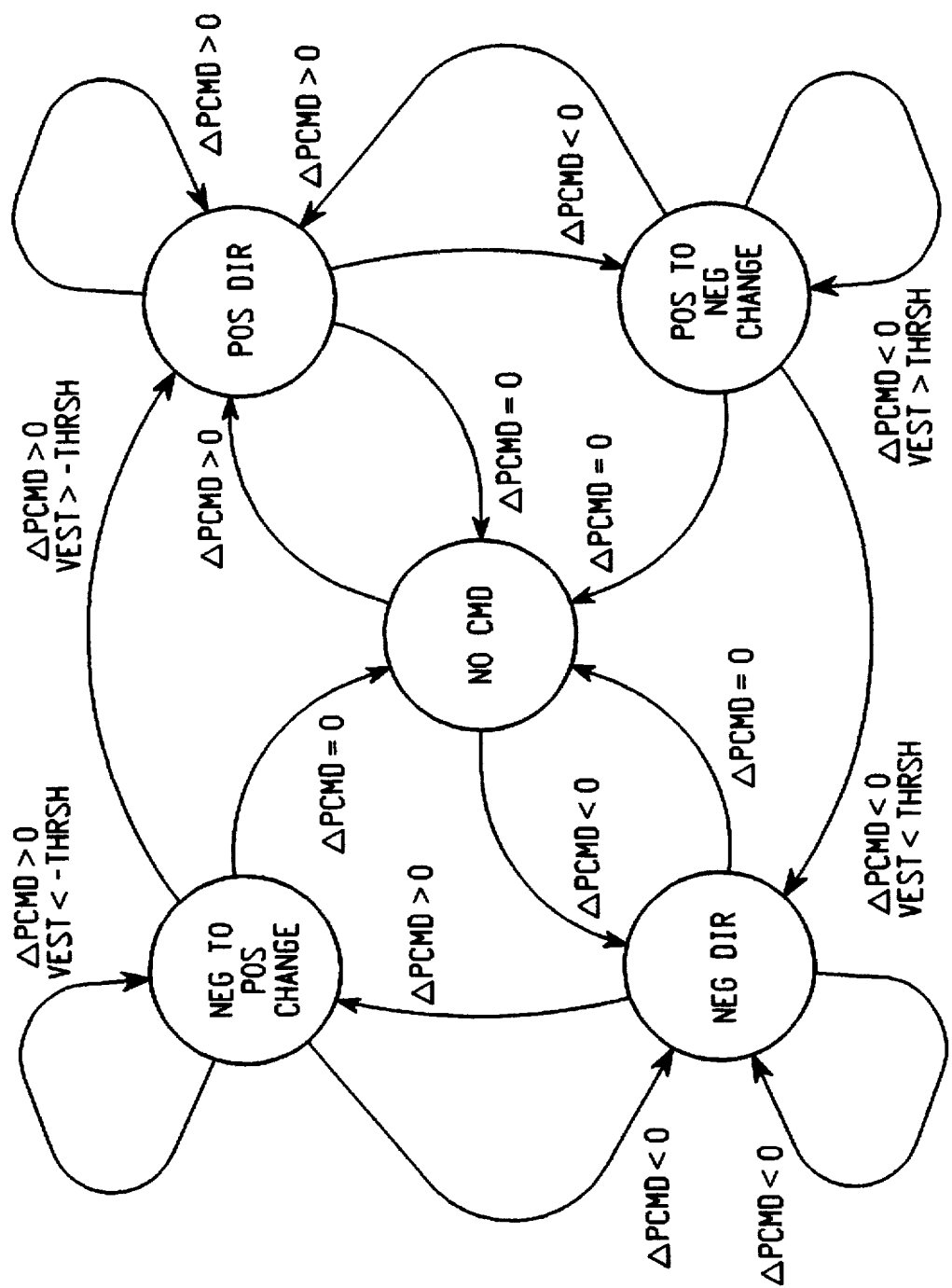
FIG. 6 is a state diagram relating to state controlled compensation.

Continuing with reference to the state model of FIG. 6, from an initial no command state, the first command in either direction produces a transition to the appropriate one of the positive and negative direction states. While in any of the positive direction, negative direction, positive to negative change, or negative to positive change states, if commanded position does not change with the next position command update interval, a transition is made to the no command state. While in either of the positive or negative direction states, no transition occurs so long as commands received are for the same direction as the current active state. If, while in a change of direction state, the next command is in the same direction as the direction state from which the change of direction state was entered, a transition occurs to that direction state.

Predetermined values of compensation are used, TPOS for the positive direction state and TNEG for the negative direction state. A transition from one compensation value to the other is effected when it is detected that the current value of compensation differs from the value of compensation associated with a direction state. A ramp function may be enabled for compensation values associated with any command coordinate axis to effect a gradual transition of compensation values triggered with a change from one direction state to another. The ramp function incrementally changes the value of compensation with each servo loop closure interval over a predetermined number of intervals to effect the transition.

Continuous Model Controlled Compensation

In accordance with the continuous model for friction compensation control illustrated in FIG. 2a, an estimate of velocity is made from commanded positions $PCMD_j$ and velocity feedforward commands VFF. Further enhancement of the velocity estimate may be achieved by use of acceleration feedforward commands AFF. Velocity feedforward commands represent the desired velocity of the affected actuator and acceleration feedforward commands represent the desired acceleration of the affected actuator. The estimate of velocity is applied to a model of the frictional torque at block 254 to produce a value of frictional torque. In systems in which servomechanism control permits input of a torque command, the output of the frictional torque model may be applied as an input to compensate for the effects of the actual frictional torque. In FIG. 2a this is illustrated by the dashed line from block 254 to summing junction 240. At summing Junction 240, the frictional torque value is added to torque commands produced by compensator 16.

In systems where facilities for compensating commanded torque directly are not available, further processing of the output of the frictional torque model of block 254 will produce a position command compensation value. At block 256 the frictional torque is scaled by the inverse of the moment of inertia of actuator and load to produce a value of acceleration representative of the effects of the frictional force. At block 258 the friction induced acceleration is filtered to implement the inverse of the compensator algorithm of block 16. The result is dimensionally equivalent to velocity and is multiplied by the inverse of the position loop gain at block 260 to produce a position compensation value. At summing junction 230 position compensation is added to the position commands $PCMD_j$. The compensated position commands are applied to summing junction 12 where position loop error is determined as the difference between compensated commanded position and actual position of the controlled element. While the functional block diagram is characterized by continuous function representations, it will be appreciated that any of the control elements may be implemented using sampled data techniques in which measured values are periodically sampled and control values are periodically produced according to predetermined procedures implementing the desired control algorithms.

In the preferred embodiment, the velocity estimate of block 252 is determined from a first-order high-pass filter. The filter is based on a model of the servomechanism assuming a velocity control loop of infinite bandwidth and proportional gain applied to the following error. In sampled data systems, position commands, velocity feedforward commands and acceleration feedforward commands are produced at a predetermined update interval. In the sampled data system of the preferred embodiment, values of estimated velocity according to a filter function operating on position commands and velocity feedforward commands may be periodically determined according to the following:

$$VEST_k = d_o * VEST_{k-1} + G_1 * ((1-d_o)*(PCMD_k - PCMD_{k-1}) + (VFF_k - VFF_{k-1})) \quad (1)$$

Where:

$d_o$ = value of pole of filter transfer function
$G_1$ = gain of velocity estimator
$PCMD_k$ = commanded position of $k^{th}$ update
$VEST_k$ = velocity estimate of the $k^{th}$ update
$VFF_k$ = feedforward velocity command of the $k^{th}$ update Should velocity feed forward commands VFF not be employed, in equation (1), the last term of the expression to be multiplied by the gain $G_1$, i.e., $(VFF_k - VFF_{k-1})$ is omitted.

The value of gain $G_1$ is used for scaling to achieve compatibility with the units of the frictional force model (i.e., if frictional force is to be computed as a function of velocity in inches per minute, the estimated velocity is scaled to be expressed in inches per minute). The value of gain $G_1$ is fixed.

The value of the velocity estimator filter pole $d_o$ is selectable and is chosen to optimize onset of position compensation at the velocity of interest. If position compensation is initiated too early or too late, the effects of the step change of frictional force will not be satisfactorily reduced. A nominal value of the filter pole $d_o$ is calculated according to:

$$d_o=1-K_vT$$

Where:

$K_v$=position loop gain in units of inverse time
T=update interval time of position commands
the units of $K_v$ and T must be the same, e.g. seconds.

As will be appreciated from the expression for estimated velocity VEST, increasing the value of the velocity estimate filter pole $d_o$ increases the contribution of previous values of estimated velocity while decreasing the contribution of the change of commanded position, effectively increasing the lag of estimated velocity to actual velocity. Excessive lag will result in generation of a transient of path error opposite in polarity to and following the transient caused by the step of frictional force at reversal.

Determination of frictional torque from estimated velocity $VEST_k$ at block 254 is effected in accordance with the relationship of velocity and force depicted by FIG. 2a. The estimated velocity is used in evaluation of the frictional force (torque) model, such as, for example, expression (i) together with the characteristic values of kinetic friction and static friction as appropriate for the current velocity and direction of the associated command coordinate axis.

For compensation effected in the position loop stage, position offset values are produced to counteract the effect of the step change of frictional torque. Position compensation values are produced by filtering the friction torque $FF_k$ with a function based on the inverse of the relationship of commanded position to motor torque. A filter having a transfer function effecting the inverse of this relationship and accounting for the inherent step of frictional torque to be opposed, defines a transient position compensation with an exponential decay. Position offsets defined in this manner as applied to a servomechanism including a proportional plus integral compensator are calculated according to:

$$POFF_k=d_{fp}*POFF_{k-1}+G_2*(FF_k-FF_{k-1}) \qquad (2)$$

Where:

$POFF_k$=position offset for $k^{th}$ update
$d_{fp}$=pole of compensation filter
$G_2$=compensation gain The value of the product of gain $G_2$ and the frictional force difference defines the amplitude of compensation. As the value of $G_2$ is defined by the inverse of the servomechanism compensator, the value of the product is varied by variation of the magnitude of the frictional force values. To establish a starting point for adjustment, the value of kinetic and/or static friction used in the friction force model is chosen such that the product comprising $G_2$ of equation (2) is equal to the magnitude of path error without friction compensation. Execution of the motion of interest is repeated and measurements made of path error, the value of the frictions of the frictional force model being adjusted with each execution until the path error is satisfactorily reduced. Excessive values of the product will introduce a path error of opposite polarity to that to be compensated.

As will be appreciated from the expression for position offset POFF, the value of filter pole $d_{fp}$ defines the rate of decay of the transient position offset. Increasing values of $d_{fp}$ increase the width of the position offset. A nominal value for filter pole $d_{fp}$ may be set using values of the position command update interval time and the gain of the integral component of the velocity loop according to:

$$d_{fp}=e^{-IT}$$

Where:

I=gain of integral component expressed in units of inverse seconds
T=update interval time of position commands in seconds
Ideally, $d_{fp}$ results in the position compensation transient having a width sufficient to eliminate the contour error attributable to the step change of friction. If too brief, the compensation will leave a portion of the contour error to be corrected. If too lasting, the compensation will introduce a contour error of opposite polarity to the error to be corrected. Empirical adjustment of $d_{fp}$ may be made to optimize reduction of contour error.

Position commands are compensated using the offset values $POFF_{I,k}$ according to:

$$PCMD_{I,k}=PGMD_{I,k}+POFF_{I,k}$$

Figure 3A:
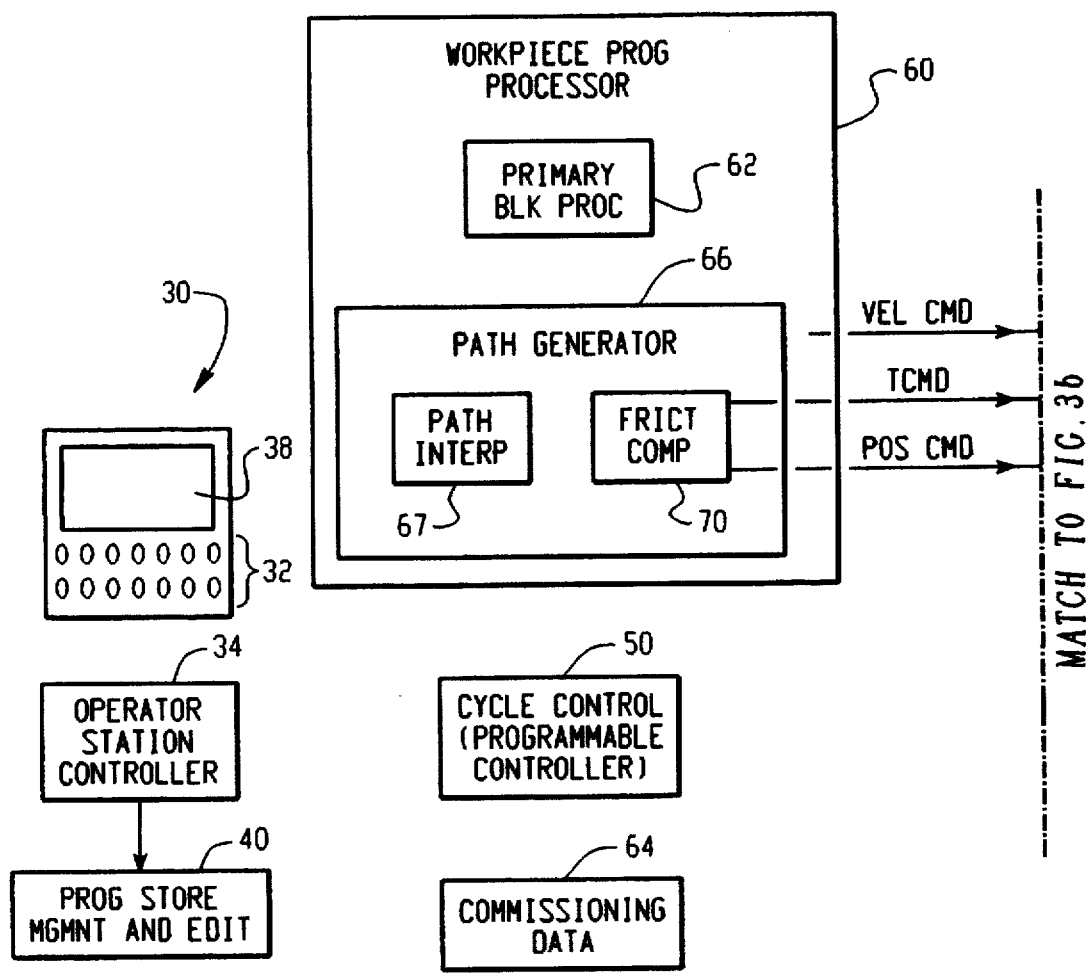
FIG. 3 is a block diagram of a controller for implementing compensation in accordance with the invention.
Figure 3B:
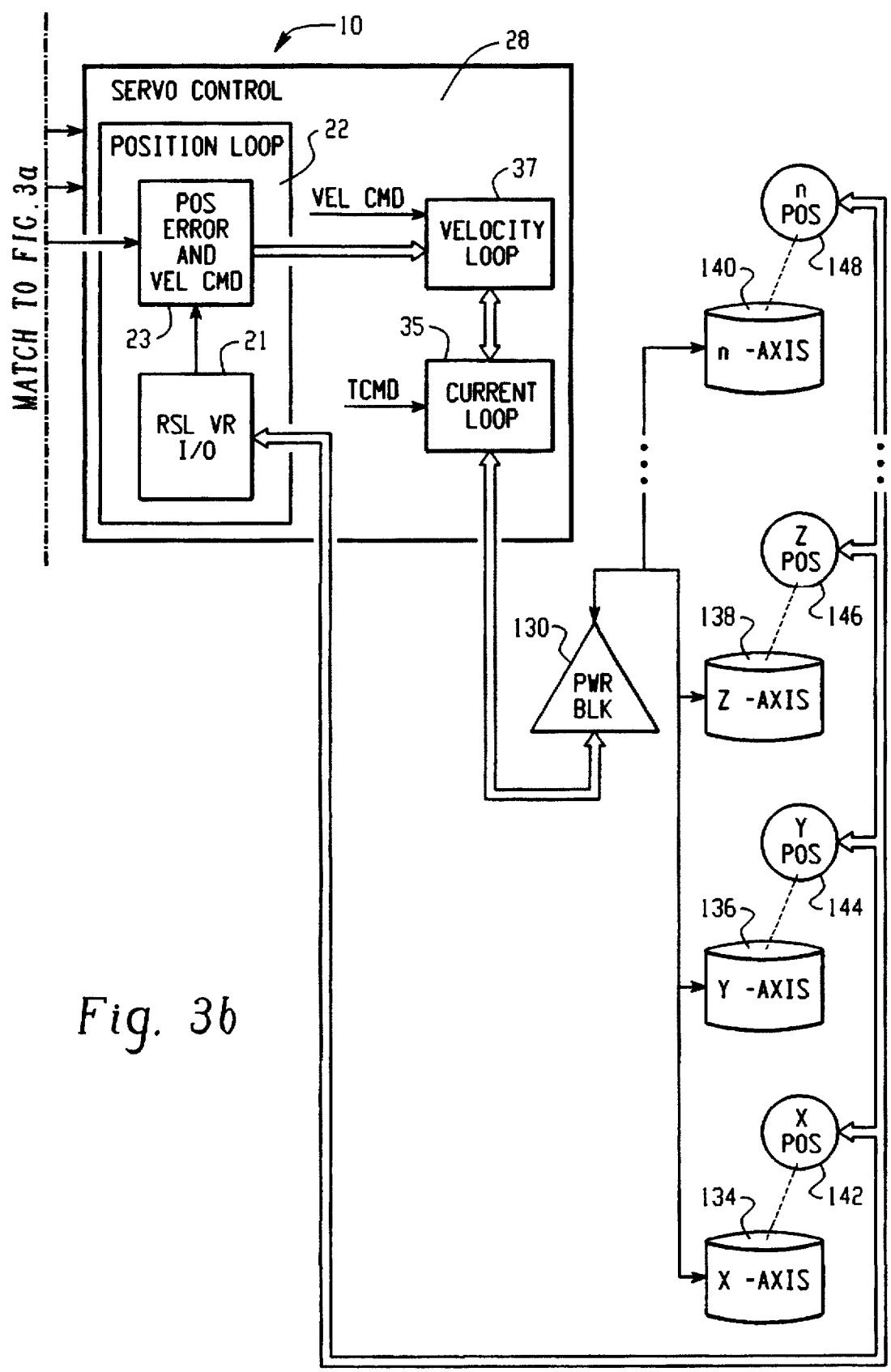

Where:

$PCMD_{I,k}$=commanded position of the $I^{th}$ command coordinate axis for the $k^{th}$ update interval
Controller Applicants have implemented friction compensation in a controller illustrated in FIG. 3.

Computer Numerical Control

Position commands for servomechanism control are generated by, for example, a computer numerical control (CNC) in response to input data supplied by, for example, a numerical control workpiece program. A CNC 10, as illustrated by the block diagram of FIG. 3, includes: an operator or user interface facility 30; program storage and edit facilities 40; machine cycle control 50; workpiece program processor 60; commissioning data store 64; and, servomechanism control 28.

The operator interface facility 30 includes a display device 38 such as a CRT or other alphanumeric display device, a manual data entry device such as keyboard 32 and an operator station controller 34. Data may be entered manually from the operator interface facility to command machine operation.

CNC 10 effects control of a machine by execution of workpiece programs comprising blocks of instructions containing data defining position axis coordinates, feed rates, cycle control codes and miscellaneous functions. These programs conform to a known programming convention, such as EIA RS 274. Workpiece programs are executed from local CNC storage. Programs are loaded to local storage by means of bulk data transfer devices such as, for example a tape reader or a data communication interface. Program loading may be initiated by user selections made through interface facility 30.

Workpiece programs are executed under control of program processor 60. Instructions of workpiece programs are decoded by block processor 62 to extract programmed data and initiate machine operations. Data required to control motion includes coordinate data specifying desired positions in coordinate axes and information defining desired velocity and motion type, for example, linear or circular. Workpiece program data required to effect servo controlled motion are passed to path generator 66.

Path generator 66 includes path point interpolation routines 67 which are executed to produce coordinate axis position commands at a position command update interval and feedforward values used by servo control 28. Position commands PGMD$_I$, designated by the command coordinate axes names X, Y, Z, ... N and an update interval designator K, i.e., X$_k$, Y$_k$, Z$_k$, ... N$_k$, reflect the rate of change of position defined by the programmed coordinates, feed rates, and cycle commands. The path generator 66 advantageously generates velocity commands for application to servo control 28 to effect velocity feedforward and torque commands as may be used advantageously to implement acceleration feedforward when applied to servo control 28.

Path generator 66 also includes friction compensation routines 70 which generate values used to effect compensation for the effects of friction acting on the moveable machine members. In accordance with one embodiment of the invention, the friction compensation routines 70 effect compensation of position commands produced by path point interpolation routines 67. In accordance with an alternative embodiment of the invention, the friction compensation routines 70 produce compensated torque commands.

Commissioning data store 64 contains values used by compensation algorithm procedures 70, including values for continuous model controlled compensation constants such as d$_o$, the velocity estimate filter pole, G2, the gain of the inverse compensation filter, and d$_{ip}$, the inverse compensation filter pole.

Servomechanism Controller

Servomechanism control 28 effects closed loop control of the machine member actuators such as motors 134 through 140 in response to commands generated by path generator processor 66. Position of the actuators is measured by position transducers 142, 144, 146 and 148 mechanically driven directly or indirectly by, respectively, motors 134, 136, 138, and 140.

Servomechanism control 28 includes position loop control 22, velocity loop control 37 and current loop control 35. Position loop control performs the functions illustrated by summing junction 12 and block 14 of FIG. 2a. Velocity loop control performs the functions illustrated by summing junction 15 and block 16 of FIG. 2a. Current loop control 35 generates current control signals for current conducting devices located at power block 130 which deliver current to motors 134 through 140. Current loop control 35 responds to torque commands and measured motor currents to determine the magnitude of current to be delivered. Details of current loop control 35 do not form a part of the present invention.

Within position loop control 22, input/output interface circuits 21 are provided for the position transducers. In the event resolvers are used as position transducers, the input/output interface circuits 21 provide the resolver excitation signals and receive the resolver output signals.

Position error and velocity command generator 23 determines differences between commanded positions PGMD$_I$ and measured positions PACT$_I$ and scales resulting position loop errors by the position loop gain K$_v$ to produce velocity commands.

Velocity loop control 37 determines differences between commanded velocities and actual velocities and implements compensator algorithms to produce torque commands. Torque commands are scaled by estimated values of the torque constants of the actuators to produce current control signals controlling delivery of current to the actuators.

While servo control 28 has been described as including position loop control 22, velocity loop control 37 and current loop control 35, alternative arrangements are known wherein velocity loop control 37 and current loop control 35 are separated from position loop control 22 and may be included as elements of an actuator controller. Further, velocity loop and current loop elements of servo control 28 may be implemented without provision for external input of torque commands or current commands. Consequently, friction compensation in accordance with the invention would then be effected by compensation of position commands as illustrated and described with reference to summing junction 230 of FIG. 2a. However, in arrangements of elements of servo control 28 which permit external input of torque commands to the servo control, friction compensation in accordance with the invention may be implemented by application of torque compensations to torque commands as illustrated and described with reference to summing junction 240 of FIG. 2a. Conversely, while friction compensation has been described as being implemented as routines executed by path generator 66, such routines could as well be implemented within servo control 28. Further, a servo control could include facilities for producing torque commands for input to a current loop control which accepts external input of torque commands.

Compensation Procedures

State Controlled Compensation

Figures 1, 4A:
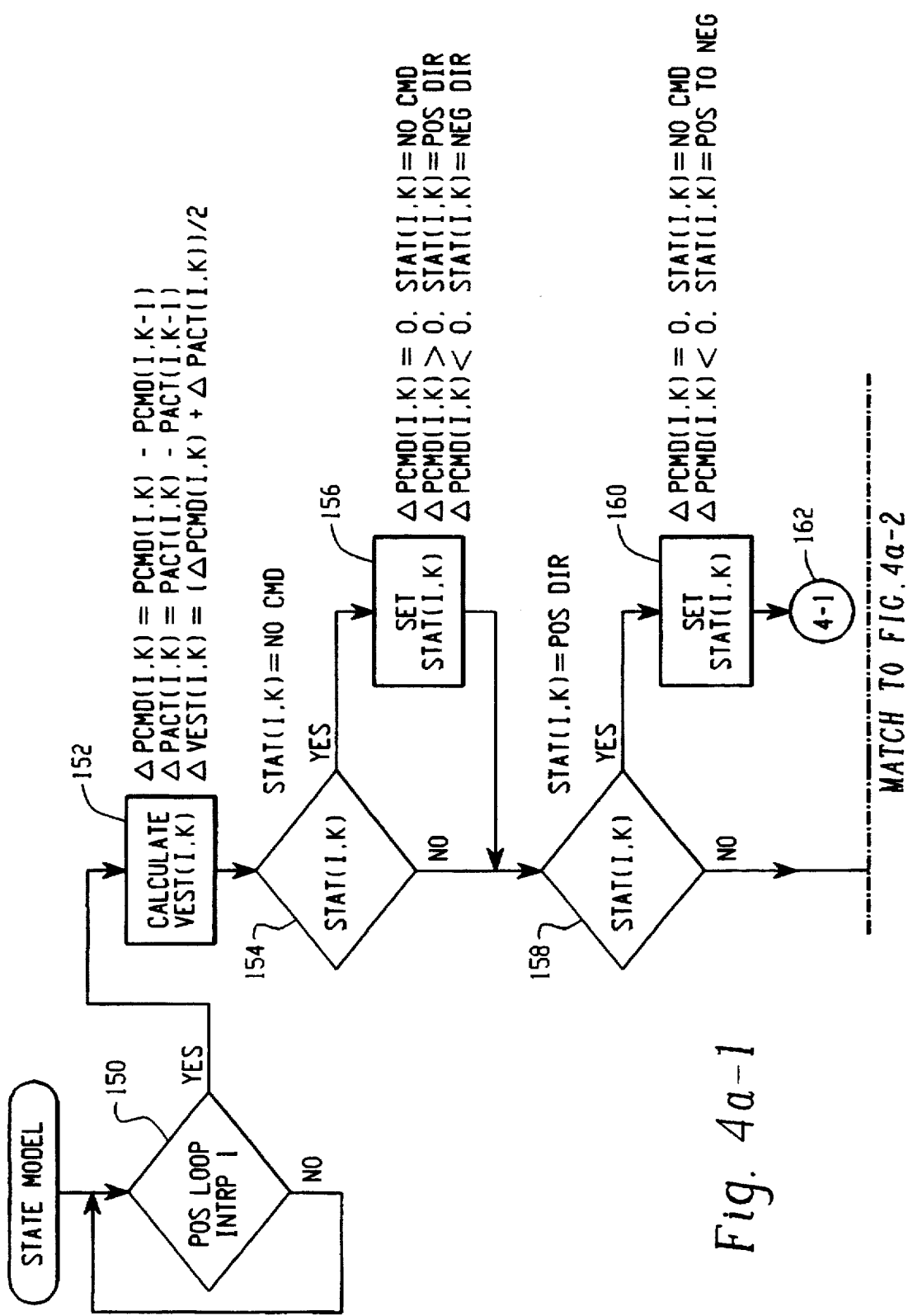
FIGS. 4a, 4b, and 4c depict a flow chart of a procedure implementing state controlled compensation.
Figure 4B:
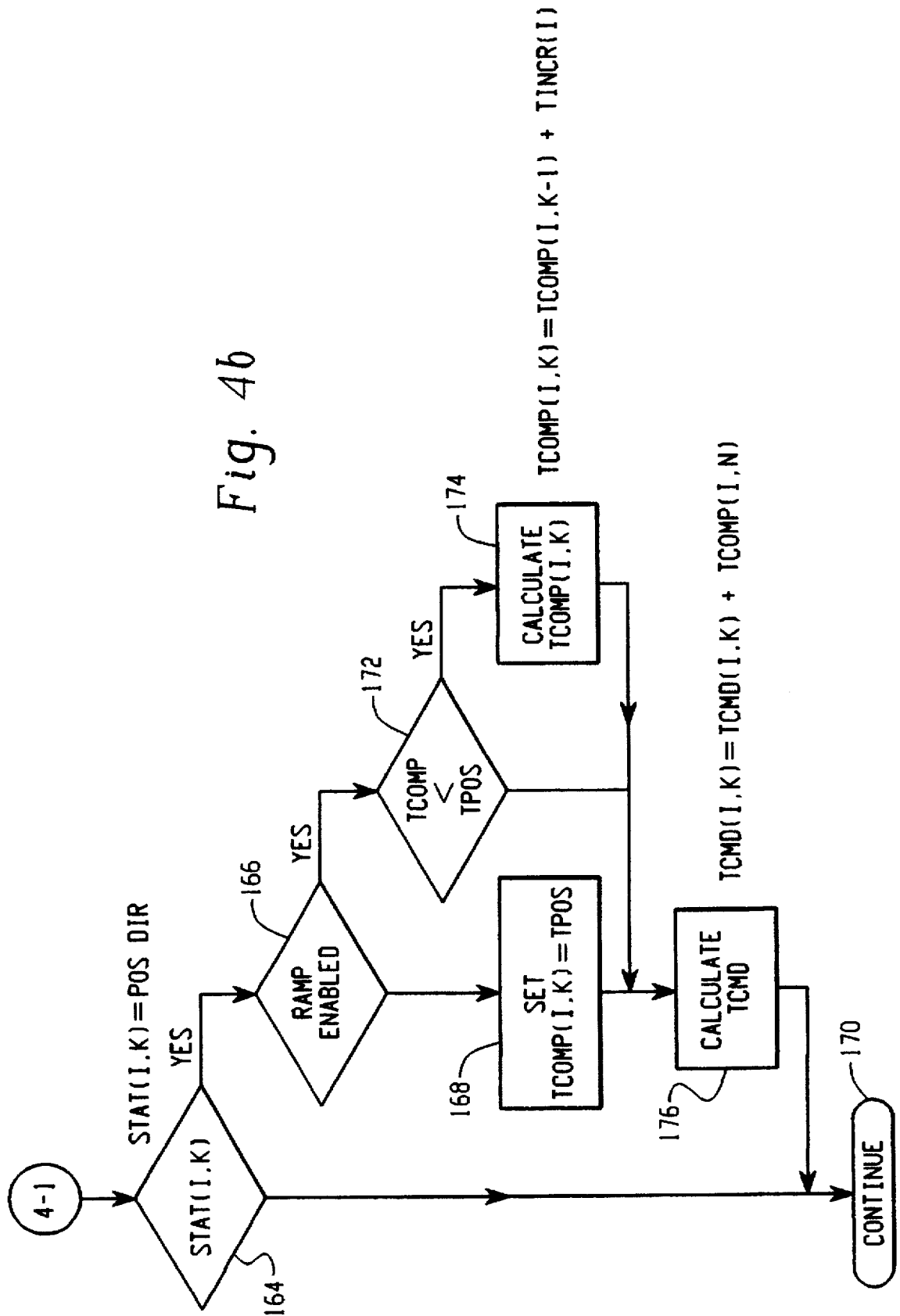
Figure 4C:
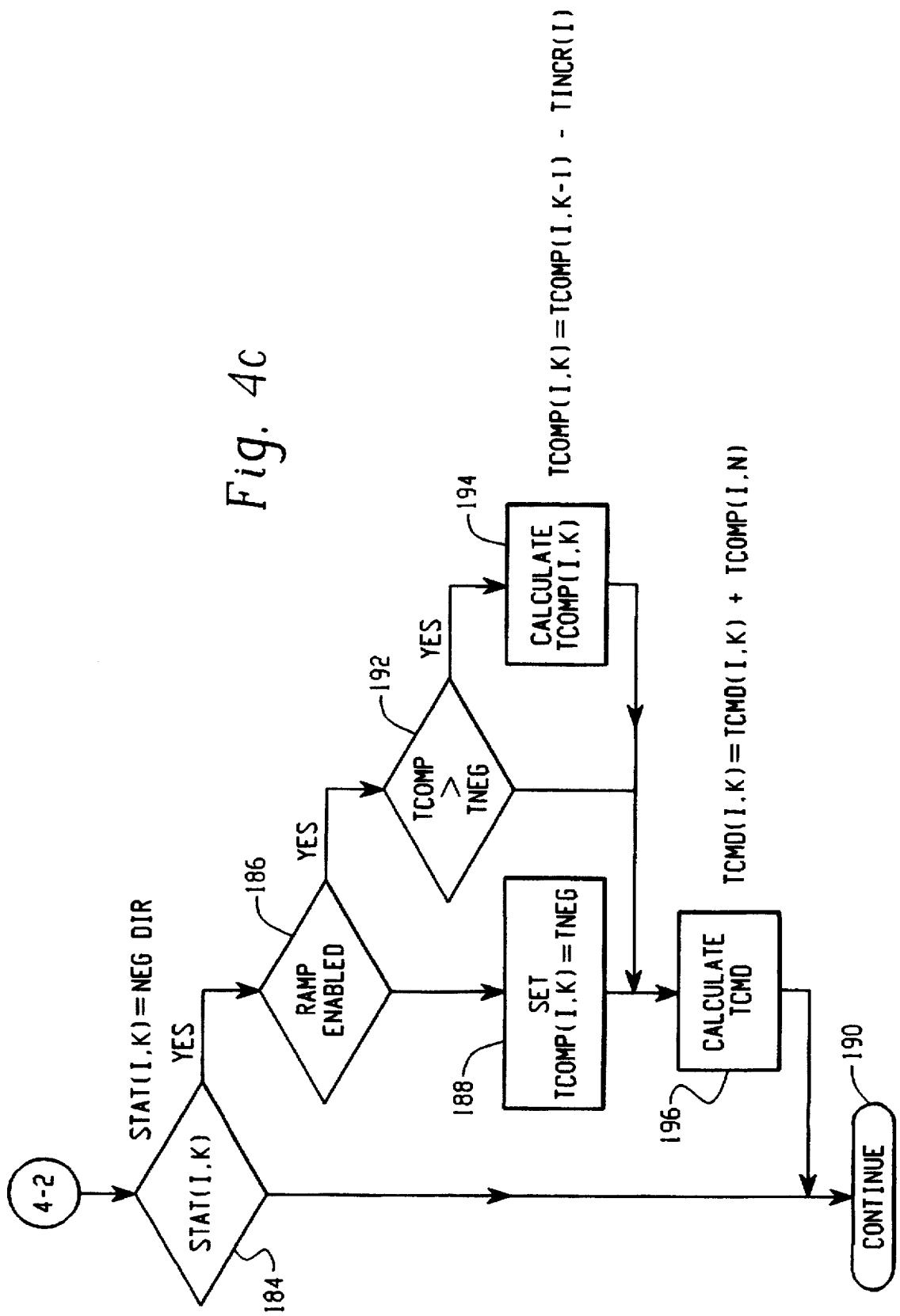

Compensation procedures 70 executed by path generation processor 66 implementing state controlled compensation in a sampled data system are illustrated by the flow charts of FIGS. 4a, 4b and 4c. As applied to systems which permit direct input of torque commands, the state controlled compensation procedures produce updated torque commands for each position loop update interval. With each update interrupt, torque commands for command coordinate axes are modified by updated compensation values according to the following:

$$TCMD_{I,K}=TCMD_{I,K}+TCOMP_{I,K}$$

Where:

TCMD=torque command

TCOMP=friction compensation

Compensation values derived from a friction model, for example a model of Coulomb friction, define magnitudes of compensation to be applied. As an alternative to computing compensation magnitudes for each update interval, a single magnitude is defined for each direction according to a chosen model. Compensation associated with the positive direction state is designated TPOS and compensation associated with the negative direction state is designated TNEG. Ramp functions are enabled for transitions between compensation values for selected command coordinate axes. Each ramp function effects incremental changes in the magnitude of a friction compensation torque value for each of a predetermined number of position update intervals. The compensation increment value is computed according to the following:

$$TINCR=(TPOS_I-TNEG_I)/N$$

Where:

N=predetermined number of position update intervals defining ramp

TPOS=predetermined torque compensation for positive direction state

TNEG=predetermined torque compensation for negative direction state

With each position update interval, the ramp function increments the compensation value according to the following:

$$TCOMP_{I,K}=TCOMP_{I,K-1}\pm TINCR$$

Where:

TCOMP=friction compensation value

TINCR=ramp increment value and the determination of whether TINGR is added or subtracted is made according to the direction of the transition (add to go from negative to positive compensation, subtract to go from positive to negative compensation)

Friction compensation values are modified by the ramp increment value TINCR until the magnitude of the compensation value equals the predetermined compensation for the current direction state.

Referring to FIG. 4a, at decision step 150 a position loop interrupt marking a predetermined position update interval is detected. New position commands $PCMD_{I,k}$, the subscript I designating the axis and the subscript k designating the update interval, are generated with each position update interval. At process step 152 a value of estimated velocity $VEST_I$ is computed for each axis as the average of commanded change in position $\Delta PCMD_I$ during the update interval and the measured change in position $\Delta PACT_I$ during the update interval. It will be appreciated that with a predetermined update interval, changes in magnitude of position are the dimensional equivalent of velocity within the interval.

Decision step 154 represents selection of command coordinate axes for which the current state is no command. At process step 156 states for these axes are set according to commanded velocity of the current update interval, i.e., maintaining the no command state if current commanded velocity is zero; setting the positive direction state if current commanded velocity is in the positive direction; and, setting the negative direction state if current commanded velocity is in the negative direction.

Decision step 158 represents selection of command coordinate axes for which the current state is positive direction. At process step 160 states for these axes are set according to commanded velocity of the current update interval, i.e., setting the no command state if current commanded velocity is zero, and setting the positive to negative transition state if current commanded velocity is in the negative direction. Execution continues with the procedure of FIG. 4b through terminal 162.

Referring to FIG. 4b., decision step 164 represents the selection of command coordinate axes for which the current state remains positive direction after execution of process step 160 of FIG. 4a. Decision step 166 represents branching of execution according to whether a transition ramp function has been enabled. For command coordinate axes in the positive direction state and for which a ramp function has been enabled, execution proceeds at decision step 172 to determine whether the current value of compensation TCOMP is less than or equal to the compensation magnitude TPOS associated with the positive direction state. If not, the compensation value is incremented at process step 174.

For command coordinate axes in the positive direction state for which a ramp function has not been enabled, the compensation value TCOMP is set equal to the magnitude associated with the positive direction state at process step 168. Following either of process steps 168 or 174, execution proceeds at process step 176 where a value of torque command is computed as the sum of the compensation value TCOMP and a torque command value generated by, for example, the path interpolation routines 67. Execution of the procedure of FIG. 4a is continued through terminal 170.

Referring to FIG. 4a, decision step 178 represents selection of command coordinate axes for which the current state is negative direction. For those axes, states are set at process step 180, i.e. the no command state is set if the current commanded velocity is zero, and the negative to positive transition state is set if the current commanded velocity is in the positive direction. Following setting of states, execution continues according to the procedure of FIG. 4c through terminal 182.

Referring to FIG. 4c, decision step 184 represents selection of command coordinate axes for which the current state remains negative direction after execution of process step 180 of FIG. 4a. Decision step 186 represents selection of those axes according to whether or not a transition ramp function has been enabled. If a ramp function has not been enabled, the compensation value TCOMP is set equal to the magnitude TNEG associated with the negative direction state at process step 188. If a ramp function is enabled, execution proceeds at decision step 192 which represents detection of a compensation magnitude greater than the magnitude associated with the negative direction state. Compensation values greater than TNEG are decremented at process step 194. Following updating of the compensation value TCOMP at one of process steps 188 and 194, a torque command value TCMD is calculated at process step 196. Execution of the procedure of FIG. 4a is continued through terminal 190.

Referring again to FIG. 4a, decision step 195 represents selection of the command coordinate axes for which the current state is the transition state positive to negative. States for those axes are set at process step 196, i.e. setting no command when the current commanded velocity is zero; setting positive direction when the current commanded velocity is in the positive direction; and, setting negative direction when the current commanded velocity is in the negative direction and the estimated velocity VEST has become more negative than the negative threshold value −THRSH. Following setting of states at process step 196 the procedure of FIG. 4c is executed through terminal 197. Continuation of execution through terminal 197 effects a change of compensation with the position update interval for which a change from one direction state to another is effected.

Continuing with reference to FIG. 4a, the sole possible state not selected by the representations of decision steps 154, 158, 178 and the "YES" side of 195 is the transition state negative to positive. The "NO" side of decision step 195 represents selection of this state. States for command coordinate axes for which the current state is negative to positive are set at process step 198, i.e. setting no command when the current commanded velocity is zero; setting negative direction when the current commanded velocity is in the negative direction; and setting positive direction when the current commanded velocity is in the positive direction and the estimated velocity exceeds the value of the positive threshold THRSH. Following setting of states at process step 198, the procedure of FIG. 4b is executed through terminal 199. Continuation of execution through terminal 199 effects a change of compensation with the position update interval for which a change from one direction state to another is effected.

Continuous Model Controlled Compensation

Figure 5:
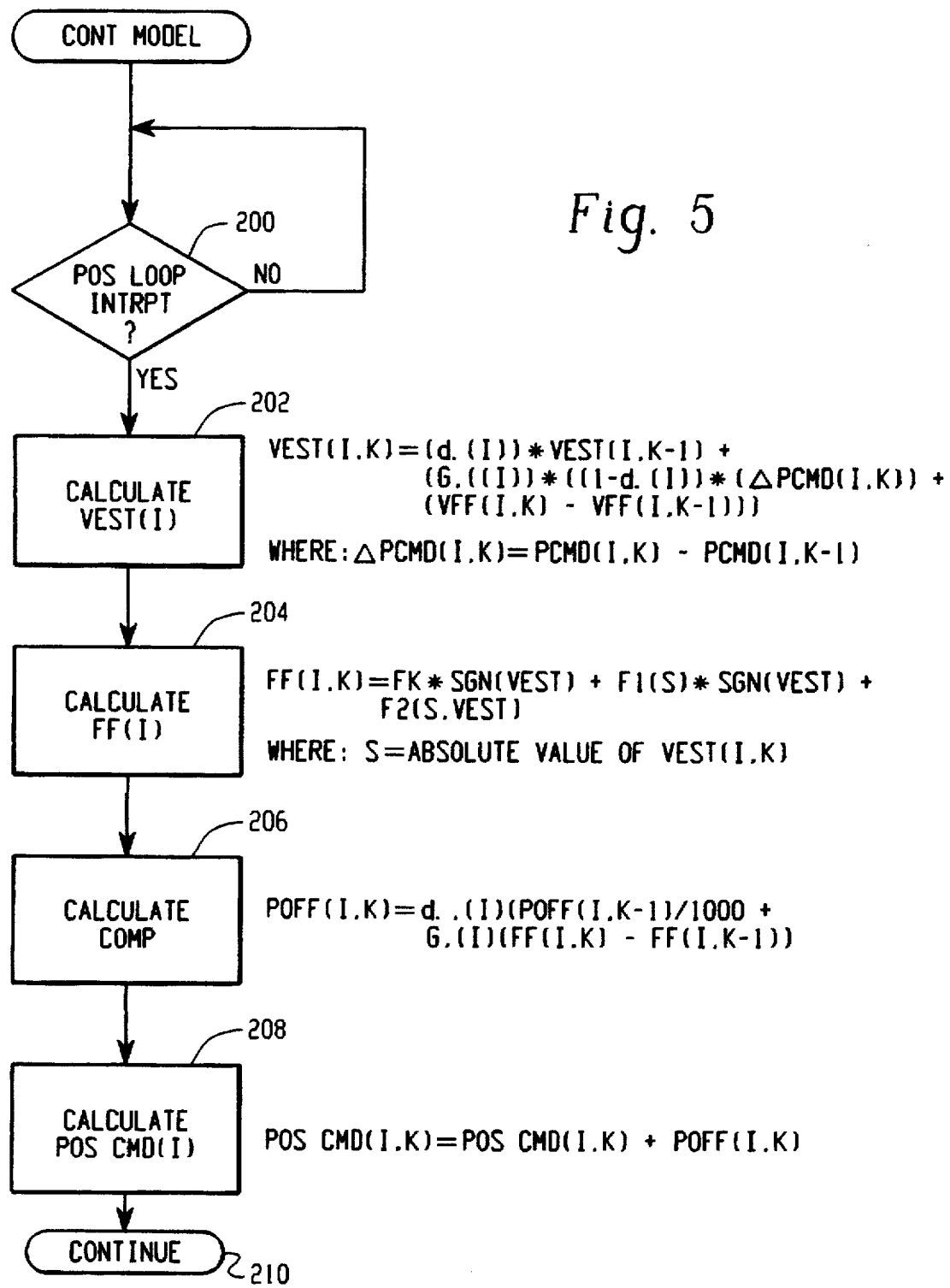
FIG. 5 is a flow chart of a procedure implementing continuous model controlled compensation.

Compensation procedures 70 executed by path generation processor 66 implementing velocity controlled compensation are illustrated by the flow chart of FIG. 5. A position loop update interrupt is detected at decision step 200. At process step 202 values of estimated velocity $VEST_I$ are calculated for all axes according to equation (1). At process step 204, values for frictional torque $FF_I$ for all axes are determined according to the selected model of frictional force and the estimated velocity values produced at process step 202. At process step 206 values of a position compensation value $POFF_{I,K}$ for all axes for the current update interval are calculated according to equation (2). At process step 208 the position commands $PCMD_I$ are modified by the compensation values $POFF_I$ to produce compensated position commands. Execution of friction compensation routines 70 is ended at terminal 210.

While the invention has been described with reference to the preferred embodiments and while the preferred embodiments have been described in considerable detail, it is not the intention of the applicants to limit the invention to such details. Rather, it is intended that the invention be defined by the scope of the appended claims and all equivalents thereto.

What is claimed is:

1. A method of servomechanism control comprising the steps of:
   a) producing a position command which is representative of the desired position of a controlled element;
   b) deriving a value of estimated velocity from the position command, wherein the estimated velocity represents actual velocity of the controlled element;
   c) determining values for frictional force as a function of estimated velocity and direction;
   d) producing a compensation value in response to the value of frictional force, the compensation value changing with time according to a predetermined algorithm; and
   e) compensating servomechanism command values in response to the compensation value, the compensated servomechanism command values including a component to oppose frictional forces affecting motion of the controlled element.

2. The method of claim 1 wherein the estimate of velocity is an average of commanded and measured velocity of the controlled element.

3. The method of claim 1 wherein the command values to be compensated are position commands.

4. The method of claim 1 wherein the command values to be compensated are torque commands.

5. The method of claim 1 wherein servomechanism commands are periodically produced and the value of estimated velocity is produced from an algorithm implementing a high pass filter function operating on successive position commands.

6. The method of claim 5 wherein the estimated velocity is produced in accordance with the following:

$$VEST_k = (d_o * VEST_{k-1} + G_1 * (1-d_o) * (PCMD_k - PCMD_{k-1})$$

Where:

$d_o$ = value of pole of filter transfer function
$G_1$ = gain of velocity estimate
$PCMD_k$ = commanded position of $k^{th}$ update
$VEST_k$ = velocity estimate of the $k^{th}$ update.

7. The method of claim 1 wherein a position command is compensated and the compensation value is produced from an algorithm implementing a first order high pass filter function defined by the inverse of the relationship of commanded position and torque of the servomechanism.

8. The method of claim 7 wherein said relationship is a proportional plus integral function and the position compensation is calculated according to the following:

$$POFF_k = (d_{hp} * POFF_{k-1}) + G_2 * (FF_k - FF_{k-1})$$

Where:

$POFF_k$ = position offset for $k^{th}$ update
$d_{hp}$ = pole of compensation filter
$FF_k$ = frictional torque of the $k^{th}$ update
$G_2$ = compensation gain.

9. The method of claim 1 wherein servomechanism commands are periodically produced and the value of estimated velocity is produced from an algorithm implementing a high pass filter function operating on successive position commands and velocity feedforward commands.

10. The method of claim 9 wherein the value of estimated velocity is produced in accordance with the following:

$$VEST_k = (d_o * VEST_{k-1} + G_1 * ((1-d_o) * (PCMD_k - PCMD_{k-1}) + (VFF_k - VFF_{k-1}))$$

Where:

$d_o$ = value of pole of filter transfer function
$G_1$ = gain of velocity estimate
$PCMD_k$ = commanded position of $k^{th}$ update
$VEST_k$ = velocity estimate of the $k^{th}$ update
$VFF_k$ = feedforward velocity command of the $k^{th}$ update.

11. The method of claim 1 further including the step of providing a velocity feed forward command and wherein the value of estimated velocity is additionally derived from the velocity feed forward command.

12. An apparatus for servomechanism control comprising:
   a) means for producing a position command which is representative of the desired position of a controlled element;
   b) means for producing a value of estimated velocity from the position command representing actual velocity of a controlled element; and
   c) means for compensating servomechanism command values in response to the estimated velocity, the means for compensating implementing a model of frictional force as a function of velocity and direction to produce a compensation value in response to the estimated velocity, the compensation value changing with time according to a predetermined algorithm.

13. The apparatus of claim 12 wherein the means for effecting compensation implements a state model of velocity direction.

14. The apparatus of claim 12 wherein the means for effecting compensation implements a continuous model of estimated velocity.

15. The apparatus of claim 12 wherein the means for compensating servomechanism commands further comprises means for producing compensated position commands, the compensated position commands including a compensation calculated to oppose a frictional force determined as a function of the estimated velocity and direction.

16. The apparatus of claim 15 wherein the means for producing compensated position commands implements an inverse of a model of the servomechanism relationship of commanded position and torque.

17. The apparatus of claim 12 wherein the means for compensating servomechanism commands further comprises means for producing compensated torque commands, the compensated torque commands including a compensation calculated to oppose a frictional force determined as a function of the estimated velocity and direction.

* * * * *